June 3, 1969  TOMOKAZU KAZAMAKI ET AL  3,447,858
PHOTOGRAPHIC OBJECTIVE OF LARGE DIAMETER AND BACK
FOCAL LENGTH COMPRISING SIX LENSES
Filed Dec. 17, 1964
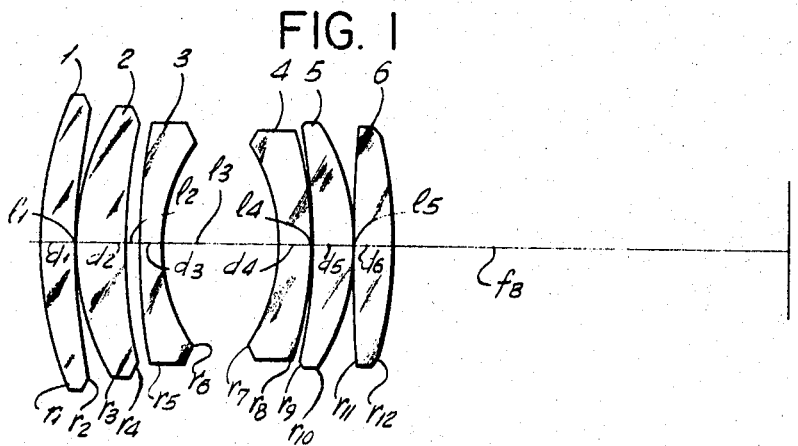
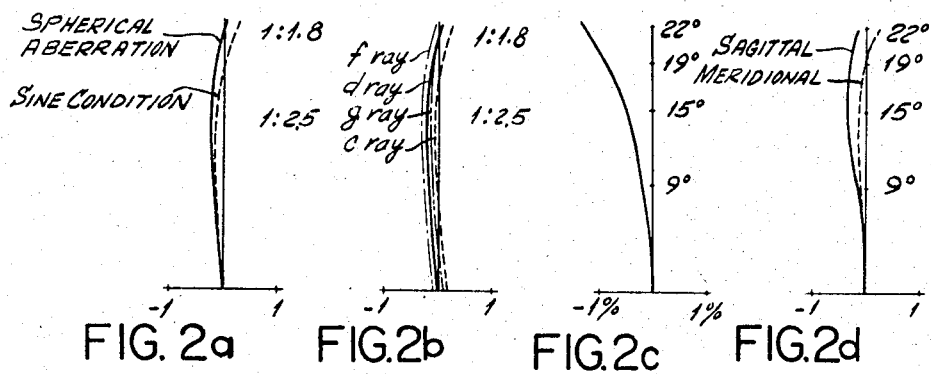
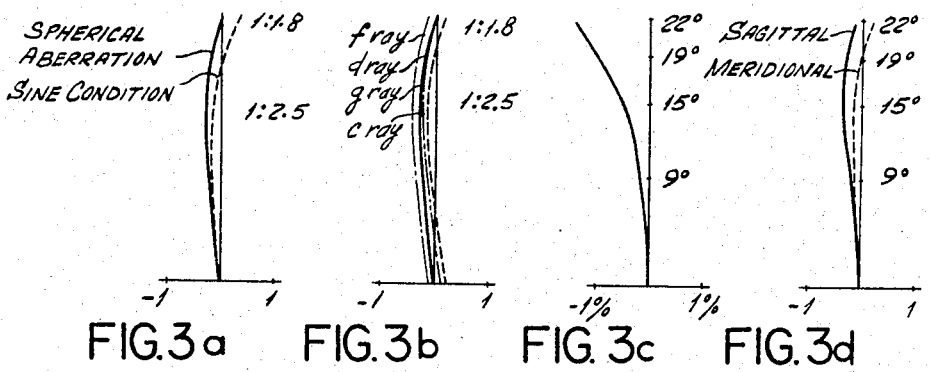
INVENTORS
TONOKAZU KAZAMAKI
TORU MATSUMOTO
BY Stanley Wolder
ATTORNEY

United States Patent Office 3,447,858
Patented June 3, 1969

3,447,858
PHOTOGRAPHIC OBJECTIVE OF LARGE DI-
AMETER AND BACK FOCAL LENGTH COM-
PRISING SIX LENSES
Tomokazu Kazamaki and Toru Matsumoto, Itabashi-ku,
Tokyo-to, Japan, assignors to Asahi Kogaku Kogyo
Kabushiki Kaisha, Tokyo-to, Japan, a corporation of
Japan
Filed Dec. 17, 1964, Ser. No. 419,146
Claims priority, application Japan, July 15, 1964,
39/39,911
Int. Cl. G02b 1/00, 9/62
U.S. Cl. 350—176    1 Claim

ABSTRACT OF THE DISCLOSURE

An objective lens system of focal length $f$ and having a long back focal length includes six separate individual lenses, the first, second, fifth and sixth lenses being positive, and the third and fourth lenses being negative, said lens system possessing the following parameters:

$f_{1234} \geq 0.5f$     $l_2 \leq 0.06f$
$f_{123456} \geq 2f$     $d_4 \geq 0.04f$
$|f_{123\ldots 8}| \leq 5f$     $n_4 \geq 1.67$
$r_2 \geq f$, $r_4 \geq 0.08f$, $|r_9| \leq 2f$, $r_{11} \geq f$, $\nu_5 \geq 40$, $\nu_6 \geq 40$, $\nu_4 \leq 30$ wherein $f_{123\ldots n}$ is the resultant focal length of the lenses between the subscript designated faces, $l_2$ is the axial distance between the confronting faces of the second and third lenses, $d_4$ is the axial thickness of the fourth lens, $n_4$ is the index of refraction of the fourth lens, $r_n$ is the radius of curvature of the corresponding subscript designated lens face, and $\nu_n$ is the $\nu$-value of the corresponding subscript designated lens.

---

The present invention relates generally to improvements in optical systems and it relates more particularly to an improved objective lens system for cameras and the like.

When it is required to position a mirror or other element between the objective lens of a camera and the image or focal plane thereof, as in the case of a single lens reflex camera, it is necessary that the back focal length of the objective lens should be longer than that of the Leica type camera. If an objective lens of a focal length of 50 mm. and of a back focal length, $f_B$, of 36 mm. is desired, then it follows that $f_B:f=0.72:1$ and hence $f_B=0.72f$. In the case of the Sonar type of lens, the back focal length is about $0.5f$ assuming an F-number of 1:2, and such lens therefore does not satisfy the aforesaid requirement. Among Gaussian type objectives which have brighter F-numbers than 1:2, a few at most possess an $f_B=0.7f$, and in addition it is generally found that with the long back focal length, $f_B$, flare is considerable. Within the range of Seidel's aberrations, the spherical aberration is proportional to the square focal length $f_B$. As a consequence it is generally understood that, in the case of a photographic objective lens system, a large diameter lens is likely to be inconsistent with a long back focal length, $f_B$, thereof.

It is therefore a principal object of the present invention to provide an improved optical system.

Another object of the present invention is to provide an improved objective lens system for photographic cameras and the like.

Still another object of the present invention is to provide an improved large diameter photographic objective lens system having a long back focal length.

A further object of the present invention is to provide an improved large diameter, large back focal length lens which is free of the disadvantages and drawbacks characterizing such lens systems and which possesses highly superior optical properties.

The above and other objects of the present invention will become apparent from a reading of the following description taken in conjunction with the accompanying drawing wherein:

FIGURE 1 is a longitudinal sectional view of photographic lens objective system embodying the present invention;

FIGURES 2a to 2d are curves showing respectively the spherical aberration and sine condition, the chromatic differences of spherical aberrations, the distortion, and the astigmatism aberration of a lens system of the present invention having a focal length of 100 millimeters, with respect to an infinitely distant object; and FIGURES 3a to 3d are curves showing respectively the spherical aberration and sine condition, the chromatic differences of spherical aberrations, the distortion, and the astigmatism aberration of said lens system with respect to an object at a distance of 6 meters when photographed to a size twice that of the conventional Leica size.

In a sense the present invention contemplates the provision of a photographic objective lens system comprising six lenses designated consecutively from front to rear as the first to the sixth lens and having faces designated consecutively from the front to rear as the first to the twelfth face, said first, second, fifth and sixth lenses being positive lenses and said third and fourth lenses being negative lenses, said lens system possessing the following parameters:

$f_{1234} \geq 0.5f$     $l_2 \leq 0.06f$
$f_{123456} \geq 2f$     $d_4 \geq 0.04f$
$|f_{123\ldots 8}| \leq 5f$     $n_4 \geq 1.67$
$r_2 \geq f$, $r_4 \geq 0.8f$, $|r_9| \leq 2f$, $r_{11} \geq f$, $\nu_5 \geq 40$, $\nu_6 \geq 40$, $\nu_4 \leq 30$ wherein $f_{123\ldots n}$ is the resultant focal length of the lenses between the subscript designated faces, that is, up to the $n$th face, $l_2$ is the axial distance between the confronting faces of the second and third lenses, $d_4$ is the axial thickness of the fourth lens, $n_4$ is the index refraction of the fourth lens, $r_n$ is the radius of curvature of the corresponding subscript designated lens face, and $\nu_n$ is the Abbe number or $\nu$-value of the corresponding subscript designated lens.

Referring now to the drawing which illustrates a preferred embodiment of the present invention, the improved photographic objective lens system comprises six axially aligned lenses designated from the front or object side to the rear or image side consecutively as the first to the sixth lens. The first lens 1 is a positive meniscus lens having a front first face of greater curvature than that of the rear second face thereof, the second lens 2 is a positive meniscus lens having a front third face of greater curvature than that of the rear fourth face thereof, and the third lens 3 is a negative meniscus lens having a front fifth face of lesser curvature than that of the rear sixth face thereof. The fourth lens 4 is a negative meniscus lens having a front seventh face of lesser curvature than that of the rear eighth face thereof, the fifth lens is a positive meniscus lens having a front ninth face of lesser curvature than that of the rear tenth face thereof, and the sixth lens is a positive lens having a front eleventh face of smaller curvature than that of the rear twelfth face thereof. The axial distance between the second and third, the fourth and fifth, the sixth and seventh, the eighth and ninth, and the eleventh and twelfth faces are designated as $l_1$, $l_2$, $l_3$, $l_4$, and $l_5$ respectively, the center thicknesses of the lens 1, 2, 3, 4, 5, and 6 are designated as $d_1$, $d_2$, $d_3$, $d_4$, $d_5$, and $d_6$ respectively, the indices of refraction of the lens 1 to 6 are designated as $n_1$ to $n_6$ respectively, and the Abbe number of $\nu$-value of lenses 1 to 6 are designated as $\nu_1$ to $\nu_6$ respectively.

The present objective lens system may be considered a modified Gaussian type lens system but possesses radically different optical charateritics. The front three lenses 1, 2, 3, will be referred to as the front lens group and the rear three lenses 4, 5, 6 will be referred to as the rear group. The power of the front lens group, as a whole, being greater than that of the rear lens group, results in a very short back focal length. As a consequence, the power of the front group must necessarily be very small. In the conventional Gaussian type objective lens system a front lens group and a rear lens group of almost the same power are arranged with a diaphragm disposed therebetween so that the positive distortion due to the front lens group and the negative distortion due to the rear lens group eliminate each other whereby to achieve the correction of distortion, and due to such symmetrical arrangement, the lateral chromatic aberration also can be eliminated with good results. However, such symmetry is not the case with the objective lens system of the present invention.

In accordance with the present invention, in order to achieve a long back focal length $f_B$, the following parameters are imparted to the present objective lens system as shown in FIG. 1 ($f_{123 \ldots n}$ indicating the resultant focal length determined by up to $n$th face of the lenses):

$f_{1234} \geq 0.5f$      $l_2 \leq 0.06f$
$f_{123456} \geq 2f$      $d_4 \geq 0.04f$
$f_{123 \ldots 8} \leq 5f$ further, $f_{123 \ldots 8} < 5f$ whereby the lens system consisting of the first four lenses 1 to 4 is equivalent to a negative lens. For correction of chromatic aberration it is preferable that radius of curvature $r_7$ is longer, while for obtaining a longer back focal length $f_B$, a shorter radius of curvature $r_7$ is desired. In order to prevent the shortening of the back focal length $f_B$ when a longer radius of curvature $r_7$ is adopted, it is necessary that a large value be given to the index of refraction $n_4$ of the fourth lens 4. Accordingly, the fourth lens index of refraction $n_4 \geq 1.67$.

It has been found that negative distortion due to the unbalanced condition of the powers of the front and the rear lens groups is decreased by making $r_2 \geq f$, $r_4 \geq 0.8f$, $|r_9| \leq 2f$, $r_{11} \geq f$. Since in the subject objective lens system the front group is of smaller power than the rear group in order that the lateral aberrations be over corrected, it is important that $r_{11} \geq f$, making the sixth lens not a meniscus, and $|r_9| \leq 2f$.

The lateral chromatic aberrations due to the non-symmetrical nature of the subject objective lens system are corrected with excellent results by selecting a high $\nu$-value for the fifth and the sixth lenses. Accordingly the following parameters are advantageously employed: $\nu_5 \geq 40$, $\nu_6 \geq 40$, $\nu_4 \leq 30$.

One example of the present invention is as follows:
With respect to an F1:1.8 objective whose focal length $f = 100$ mm.: $f_B = 74.64$:

| | | | |
|---|---|---|---|
| $r_1 = 71.750f$ | $d_1 = 7.00$ | $n_1 = 1.8377$ | $\nu_1 = 42.0$ |
| $r_2 = 191.724$ | $l_1 = 0.20$ | | |
| $r_3 = 48.800$ | $d_2 = 9.00$ | $n_2 = 1.8372$ | $\nu_2 = 43.3$ |
| $r_4 = 102.065$ | $l_2 = 3.00$ | | |
| $r_5 = 135.000$ | $d_3 = 3.00$ | $n_3 = 1.7408$ | $\nu_3 = 27.7$ |
| $r_6 = 31.162$ | $l_3 = 22.00$ | | |
| $r_7 = -31.500$ | $d_4 = 6.10$ | $n_4 = 1.7618$ | $\nu_4 = 26.5$ |
| $r_8 = -70.335$ | $l_4 = 0.20$ | | |
| $r_9 = -109.300$ | $d_5 = 8.00$ | $n_5 = 1.8042$ | $\nu_5 = 46.6$ |
| $r_{10} = -44.537$ | $l_5 = 0.10$ | | |
| $r_{11} = 670.000$ | $d_6 = 6.50$ | $n_6 = 1.7130$ | $\nu_6 = 53.9$ |
| $r_{12} = -93.563$ | | | |

The table of Seidel's aberration coefficient in connection with the above objective lens system is as follows:

| | $S_1$ | $S_2$ | $S_3$ | $P$ | $S$ |
|---|---|---|---|---|---|
| 1 | 0.671 | 0.481 | 0.345 | 0.635 | 0.703 |
| 2 | 0.024 | -0.100 | 0.415 | -0.237 | -0.730 |
| 3 | -0.059 | -0.054 | -0.049 | 0.933 | 0.806 |
| 4 | 0.643 | -0.807 | 1.012 | -0.446 | -0.709 |
| 5 | -0.978 | 0.968 | -0.957 | 0.315 | 0.635 |
| 6 | -1.117 | -0.925 | -0.675 | -1.365 | -1.764 |
| 7 | -3.159 | -0.051 | 0.000 | -1.372 | -0.022 |
| 8 | -0.017 | 0.034 | -0.068 | 0.614 | -1.093 |
| 9 | 0.003 | -0.026 | 0.218 | -0.407 | 1.555 |
| 10 | 2.163 | 0.295 | 0.040 | 1.000 | 0.145 |
| 11 | -0.008 | 0.041 | -0.197 | 0.062 | 0.645 |
| 12 | 2.058 | 0.195 | 0.018 | 0.44 | 0.043 |
| $\sigma$ | 0.223 | 0.050 | 0.010 | 0.176 | 0.212 |

In the above table, $S_1$ indicates spherical aberration: $S_2$ coma; $S_3$ astigmatism; $P$ Petzval sum and $S_5$ distortion.

Each of the aberration coefficients with respect to each of the faces is of very natural small value, and the Petzval sum is also excellently small.

The result of the ray tracing as shown in FIG. 2 indicates excellent correction of each aberration. As indicated in FIG. 2a which shows spherical aberration and sine condition and in FIG. 2b which shows chromatic differences of spherical aberrations, the spherical aberration is very small and corrections of the longitudinal chromatic aberration is excellent just as if it resulted from a symmetrical type of objective lens system, and in addition the residues resulted in very small values. FIG. 2c shows distortion which is of excellently small value for such a non-symmetrical type objective lens system. The astigmatism aberration as shown in FIG. 2d is also of excellent value and a pretty blur will be produced at parts where the image is out of focus. FIG. 3 shows the aberrations corresponding to FIG. 2, when $f = 100$ mm. and the object is spaced at a distance of 6 meters. Although an objective of large diameter is utilized here, the change of aberrations due to the variation of the distance up to object remain very small.

While there has been described and illustrated a preferred embodiment of the present invention it is apparent that numerous alterations, omissions and additions may be made without departing from the spirit thereof.

What is claimed is:

1. A photographic objective lens system of focal length $f$ comprising six lenses designated consecutively from front to rear as the first to the sixth lens and having faces designated consecutively from front to rear as the first to the twelfth face and having substantially the following parameters:

| | | | |
|---|---|---|---|
| $r_1 = 0.71750f$ | | | |
| $r_2 = 1.91724f$ | $d_1 = 0.0700f$ | $n_1 = 1.8377$ | $\nu_1 = 42.0$ |
| $r_3 = 0.48800f$ | $l_1 = 0.0020f$ | | |
| $r_4 = 1.02065f$ | $d_2 = 0.900f$ | $n_2 = 1.8372$ | $\nu_2 = 43.3$ |
| $r_5 = 1.35000f$ | $l_2 = 0.0300f$ | | |
| $r_6 = 0.31162f$ | $d_3 = 0.0300f$ | $n_3 = 1.7408$ | $\nu_3 = 27.7$ |
| $r_7 = -0.31500f$ | $l_3 = 0.2200f$ | | |
| $r_8 = -0.70335f$ | $d_4 = 0.0610f$ | $n_4 = 1.7618$ | $\nu_4 = 26.5$ |
| $r_9 = -1.09300f$ | $l_4 = 0.0020f$ | | |
| $r_{10} = -0.44537f$ | $d_5 = 0.080f$ | $n_5 = 1.8042$ | $\nu_5 = 46.6$ |
| $r_{11} = 6.70000f$ | $l_5 = 0.0010f$ | | |
| $r_{12} = 0.93563f$ | $d_6 = 0.0650f$ | $n_6 = 1.7130$ | $\nu_6 = 53.9$ | wherein $r_n$ is the radius of curvature of the corresponding subscript designated face, $d_n$ is the axial thickness of the corresponding subscript designated lens, $l_n$ is the axial distance between the rear face of the corresponding subscript designated lens and the confronting face of the next successive lens, $n_n$ is the index of refraction of the corresponding subscript designated lens, and $\nu_n$ is the $\nu$-value of the corresponding subscript designated lens.

References Cited
UNITED STATES PATENTS

| | | | |
|---|---|---|---|
| 2,735,340 | 2/1956 | Aklin | 350—176 |
| 2,774,280 | 12/1956 | Cook | 350—215 |
| 2,826,117 | 3/1958 | Mukai | 350—215 |
| 2,986,071 | 5/1961 | Baker | 350—176 |

JOHN K. CORBIN, *Primary Examiner.*

U.S. Cl. X.R.

350—215